United States Patent
Foster et al.

(10) Patent No.: US 10,225,987 B2
(45) Date of Patent: Mar. 12, 2019

(54) DISCHARGE GUIDE FOR AN AGRICULTURAL HARVESTER

(71) Applicant: CNH AMERICA LLC, New Holland, PA (US)

(72) Inventors: Christopher A. Foster, Denver, PA (US); Douglas S. Fitzkee, Ephrata, PA (US); John H. Posselius, Ephrata, PA (US); Mike Mielke, Andover, IL (US)

(73) Assignee: CNH Industrial America LLC, New Holland, PA (US)

( * ) Notice: Subject to any disclaimer, the term of this patent is extended or adjusted under 35 U.S.C. 154(b) by 508 days.

(21) Appl. No.: 13/711,653

(22) Filed: Dec. 12, 2012

(65) Prior Publication Data

US 2014/0162740 A1    Jun. 12, 2014

(51) Int. Cl.
*A01F 12/30* (2006.01)
*A01D 41/12* (2006.01)

(52) U.S. Cl.
CPC .......... *A01F 12/30* (2013.01); *A01D 41/1243* (2013.01)

(58) Field of Classification Search
CPC ... A01D 41/1243; A01F 12/40; A01F 12/444; A01F 12/44; A01F 29/12
USPC ................................................. 460/111, 112
See application file for complete search history.

(56) References Cited

U.S. PATENT DOCUMENTS

| | | | | |
|---|---|---|---|---|
| 2,806,339 A | * | 9/1957 | Whitney | 56/16.6 |
| 3,053,033 A | * | 9/1962 | Maguire | 56/13.6 |
| 3,369,350 A | * | 2/1968 | Rogers et al. | 56/11.9 |
| 3,577,871 A | * | 5/1971 | Engler | 56/255 |
| 4,121,778 A | * | 10/1978 | Quick | 241/79 |
| 4,306,409 A | * | 12/1981 | Wulfers | 56/320.2 |
| 4,637,406 A | * | 1/1987 | Guinn et al. | 460/112 |
| 4,711,253 A | * | 12/1987 | Anderson | 460/100 |
| 5,761,894 A | | 6/1998 | Evans | |
| 5,797,793 A | * | 8/1998 | Matousek et al. | 460/111 |
| 6,346,193 B1 | * | 2/2002 | Bauer | 210/615 |
| 7,544,126 B2 | | 6/2009 | Lauer et al. | |
| 7,635,299 B2 | * | 12/2009 | Murray et al. | 460/111 |
| 7,784,255 B2 | * | 8/2010 | Moore et al. | 56/320.1 |
| 8,475,248 B2 | * | 7/2013 | Farley | 460/111 |
| 2004/0261389 A1 | | 12/2004 | Shields | |
| 2007/0111766 A1 | * | 5/2007 | Holmen | 460/111 |
| 2009/0205791 A1 | | 8/2009 | San Folch | |
| 2011/0023435 A1 | | 2/2011 | Matousek et al. | |
| 2011/0023436 A1 | | 2/2011 | Matousek et al. | |
| 2011/0023731 A1 | | 2/2011 | Matousek et al. | |
| 2011/0165922 A1 | | 7/2011 | Farley | |
| 2012/0208608 A1 | * | 8/2012 | Ricketts et al. | 460/44 |

* cited by examiner

*Primary Examiner* — Thomas B Will
*Assistant Examiner* — Joan D Misa
(74) *Attorney, Agent, or Firm* — Rebecca L. Henkel; Rickard K. DeMille

(57) ABSTRACT

An agricultural harvester discharge guide includes a porous apparatus adapted for mounting to a discharge end of the agricultural harvester for guiding crop residue discharged from the agricultural harvester.

19 Claims, 4 Drawing Sheets

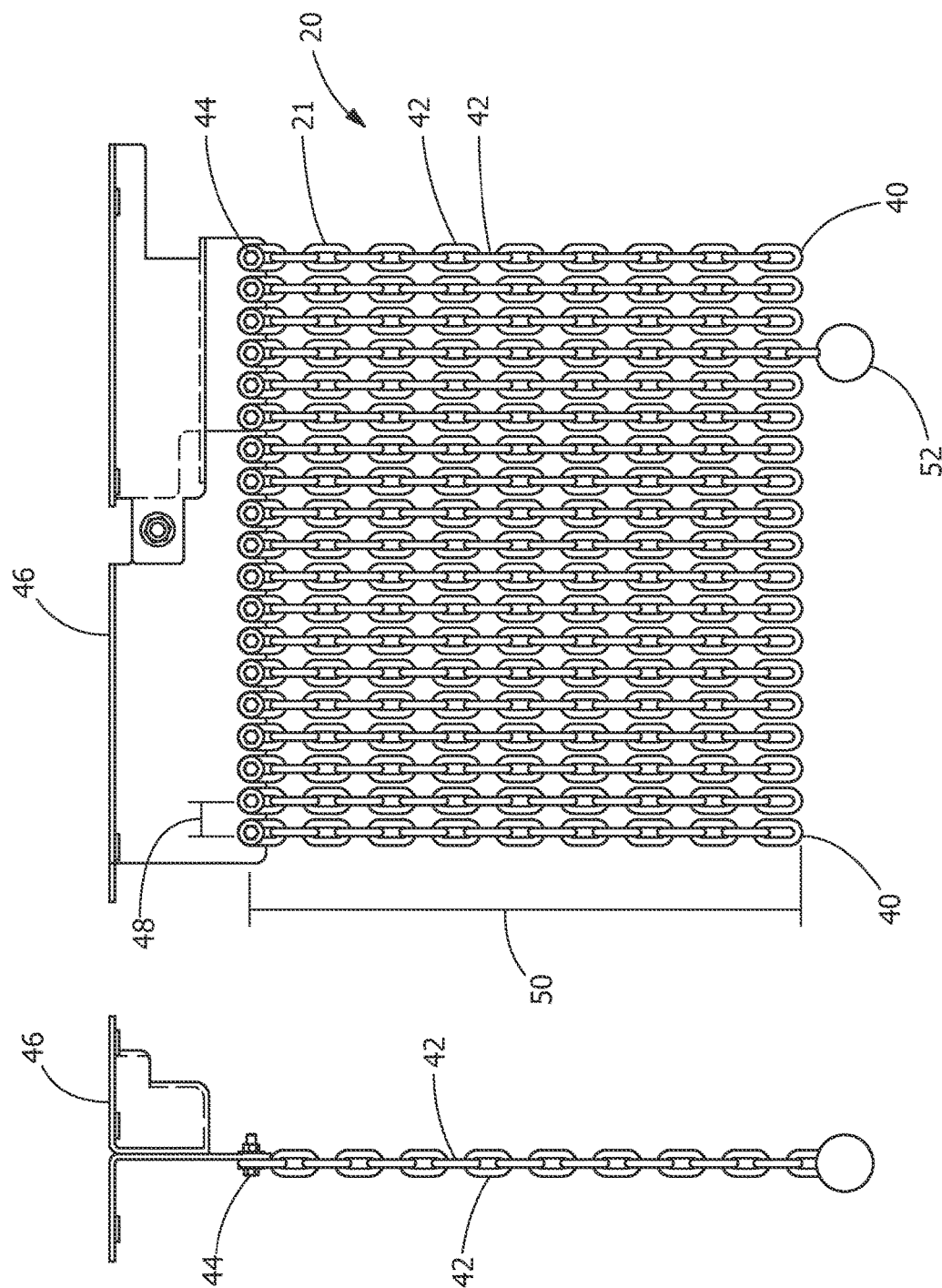

DISCHARGE GUIDE FOR AN AGRICULTURAL HARVESTER

FIELD OF THE INVENTION

This invention relates generally to an agricultural harvester and an apparatus which is operable for guiding discharge of a flow of straw or other crop residue for deposit on and over a field, and the method of use thereof, and, more particularly, to a porous apparatus operably connected to the agricultural harvester, which apparatus to guide the discharge flow of crop residue, for instance, so as to guide/distribute crop residue on an agricultural field from which the crop was harvested or guide/distribute the crop residue onto a processing implement towed behind the agricultural harvester.

BACKGROUND OF THE INVENTION

Historically, agricultural harvesters have typically included or had associated therewith a crop residue spreader for disposing onto the field from which the crop was harvested the straw and other residue separated from the harvested crop. In addition, some agricultural harvesters have employed a chaff spreader for spreading chaff residue separated from the grain by the cleaning apparatus or system onto the crop field. It is desirable to provide an even distribution of crop residue across the entire cut-width of the agricultural harvester.

Alternately, it may be desirable to bale the residue discharged from the agricultural harvester. Although it has been attempted to tow the baling implement directly behind the agricultural harvester as disclosed in U.S. Publication No. 2004/261,389, formidable challenges exist. Notably, the residue is entrained in a large volume of high velocity air flowing from the discharge opening of the agricultural harvester which is directed onto the conveyor of the baling implement. Consequently, a significant amount of the residue entrained in the high velocity air that is "blasted" onto the baling conveyer ricochets off the conveyor and is distributed onto the field, which is highly undesirable.

Thus, what has been sought is a residue guide apparatus operably connected to the agricultural harvester that reduces the velocity of discharge flow of crop residue to permit efficient distribution of crop residue onto a processing implement towed behind the agricultural harvester, or alternatively resulting in a more compact windrow of crop residue that is deposited onto the field.

SUMMARY OF THE INVENTION

The present invention relates to an agricultural harvester discharge guide including a porous apparatus adapted for mounting to a discharge end of the agricultural harvester for guiding crop residue discharged from the agricultural harvester.

The present invention further relates to an agricultural harvester discharge guide including a flexible porous apparatus adapted for suspendible mounting to a discharge end of the agricultural harvester for guiding crop residue discharged from the agricultural harvester.

The present invention further relates to a method for guiding discharge from an agricultural harvester including mounting a porous apparatus to a discharge end of the agricultural harvester for guiding crop residue discharged from the agricultural harvester.

The present invention yet further relates to an agricultural harvester operatively connected to a processing implement including a porous apparatus adapted for mounting to a discharge end of the agricultural harvester for guiding crop residue discharged from the agricultural harvester. The agricultural harvester is adapted for towing the processing implement to receive guided crop residue discharge from the agricultural harvester.

An advantage of the present invention is the capability to distribute crop residue in a more controlled manner.

A further advantage of the present invention is the capability to more effectively distribute crop residue onto a processing implement.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 3 is a side view of an exemplary discharge guide taken from region 3 of FIG. 2.

FIG. 4 is a front view of the discharge guide of FIG. 3.

Wherever possible, the same reference numbers will be used throughout the drawings to refer to the same or like parts.

DETAILED DESCRIPTION OF THE INVENTION

Figure 1:
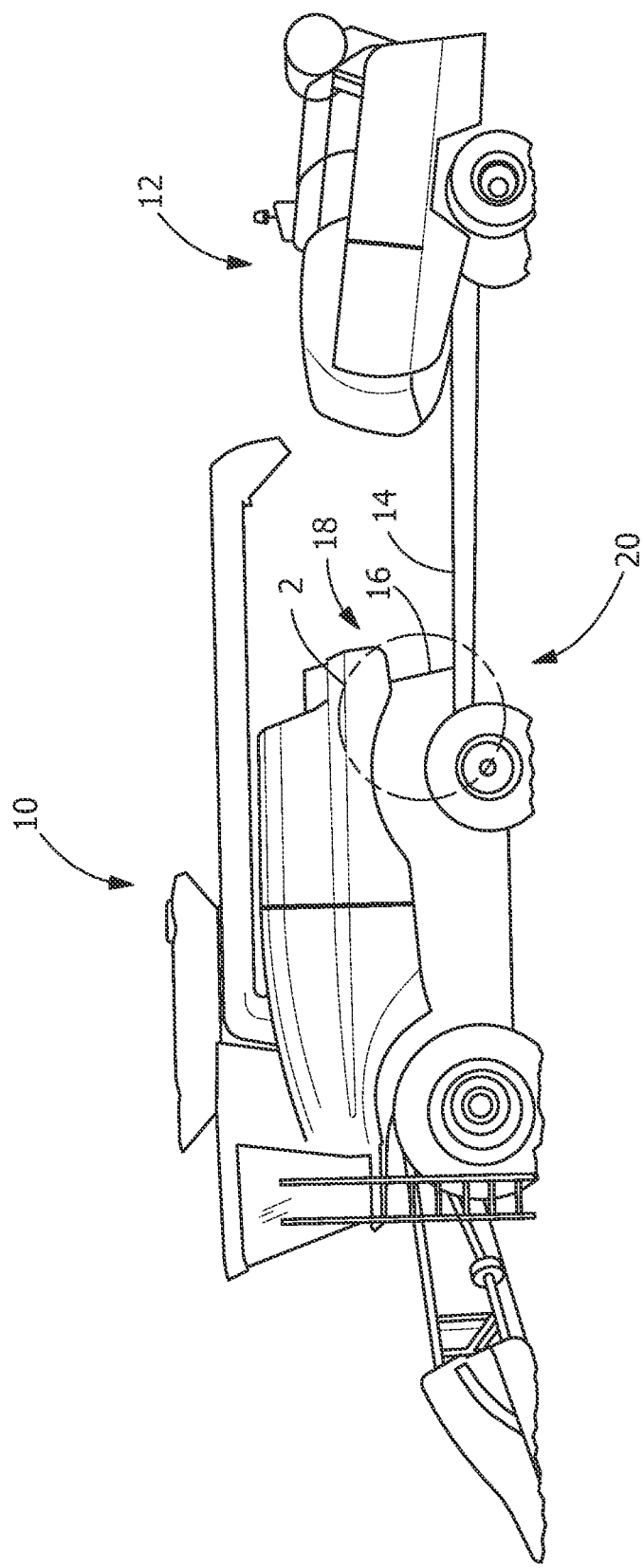
FIG. 1 is a simplified, side view of an exemplary agricultural harvester towing a processing implement, the agricultural harvester including a discharge guide.

Referring now to the drawings, FIG. 1 depicts an agricultural harvester 10 towing a processing implement 12, such as a baler. Processing implement 12 includes a collection device 14 for receiving crop residue 16, such as straw, stalks and the like, also commonly referred to as material other than grain (MOG). Crop residue 16 is conveyed or discharged from a discharge end 18 of agricultural harvester 10 in a well known manner, such as disclosed in Applicant's application Ser. No. 13/55/,801, titled FLOW DISTRIBUTION SYSTEM FOR CONTROLLING APPLICATION WIDTH OF RESIDUAL CROP MATERIAL, which is hereby incorporated by reference in its entirety. As will be discussed in greater detail below, a discharge guide 20 associated with discharge end 18 permits efficient, controlled distribution of crop residue 16 onto a processing implement towed behind agricultural harvester 10, or alternatively resulting in a more compact windrow of crop residue 16 that is deposited onto an agricultural field.

Figure 2:
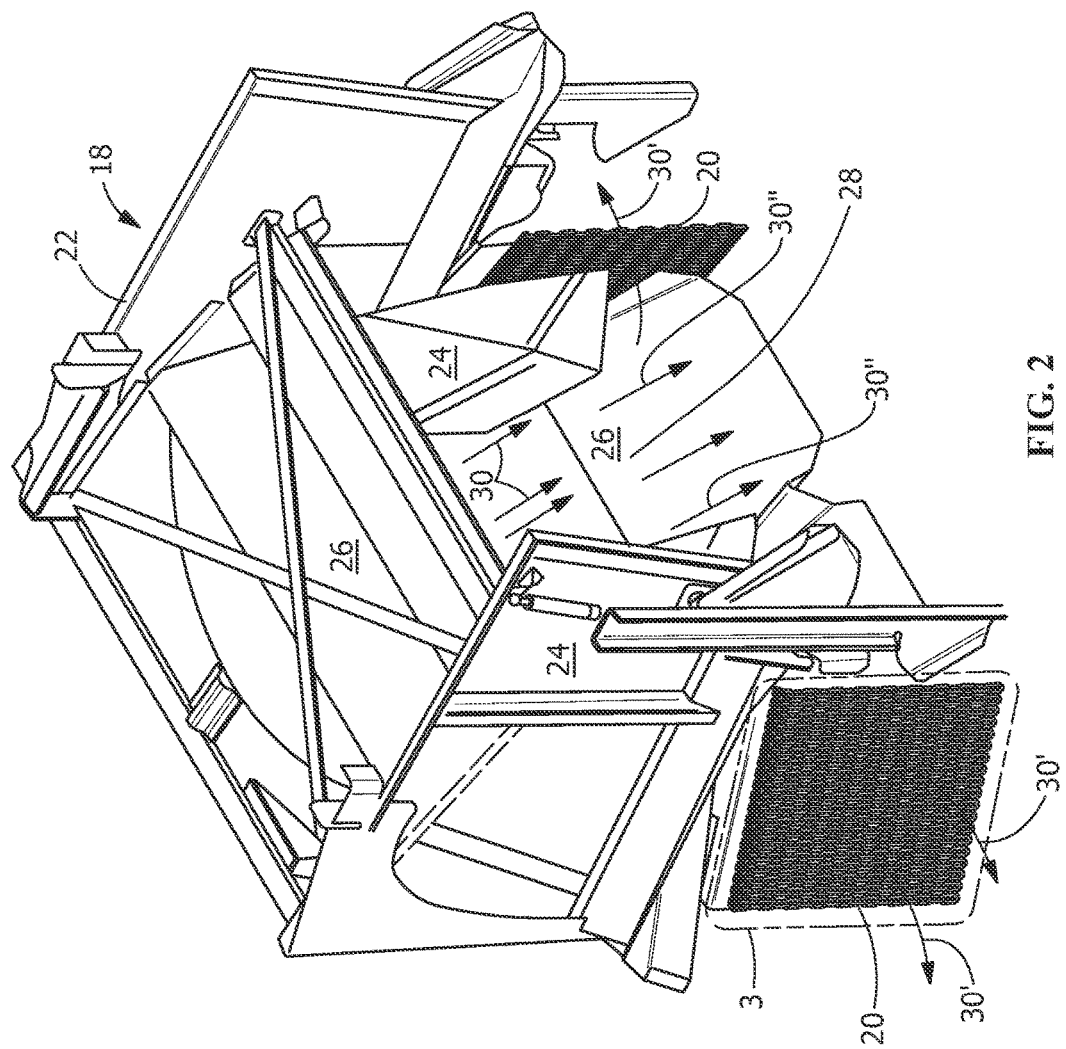
FIG. 2 is a cutaway upper perspective view of an exemplary discharge end of an agricultural harvester taken from region 2 of FIG. 1.

As shown in FIG. 2 which is taken along a region 2 of FIG. 1, discharge end 18 of agricultural harvester 10 includes a hood or housing 22 having opposed sides 24, 26 extending to an opening 28 through which crop residue 16 (FIG. 1) is discharged. Crop residue 16 can be discharged from opening 28 onto collection device 14 of processing implement 12 (FIG. 1), or alternately discharged onto an agricultural field, forming a windrow (not shown). A discharge guide 20 (a pair of opposed discharge guides 20 are shown in FIG. 2) is adapted for mounting to structure positioned generally along lateral portion(s) of opening 28 extending from opposed sides 24 toward a lower side 26. During harvesting, crop residue 16 (shown in FIG. 1) is entrained in a large volume of high velocity air 30 flowing toward discharge opening 28 of the agricultural harvester 10. However, as shown in FIG. 2, a portion of the high velocity air 30' flows through the porous discharge guides 20 while preventing or generally containing crop residue 16. That is, discharge guide(s) 20 are sized and configured to filter crop residue 16 from flowing through discharge guide(s) 20, while permitting the flow of high velocity air 30' through the discharge guide(s) 20. As a result, the amount of air flowing through discharge opening 28 is reduced, and is identified as discharge air 30", and the amount of crop residue 16 formerly entrained in the flow of air 30' through discharge guide(s) 20 is now entrained in discharge air 30". Consequently, the velocity of discharge air 30" is further slowed. As a result of both the reduction of volume of discharge air 30" and the increased concentration of crop residue entrained in discharge air 30", increased control of discharged crop residue 16 is achieved. In one instance, in which crop residue 16 is discharged or directed onto the conveyor of processing implement 12 (FIG. 1), the reduced velocity discharge air 30", now more heavily entrained with crop residue 16, is less susceptible to "blasting" or ricocheting off of the conveyor of processing implement 12 and onto the field. In other words, an increased amount of crop residue 16 is available to be processed by the processing implement 12 Alternately, in which crop residue 16 is directly discharged or directed onto the field, the resulting windrow formed by crop residue 16 entrained in discharge air 30" is better controlled and applied in a more uniform manner.

In one embodiment, discharge guide 20 can extend continuously along at least a portion of discharge opening 28. In another embodiment, discharge guide 20 can extend continuously along substantially the entire periphery of or substantially surround discharge opening 28. In another embodiment, discharge guide 20 may comprise one or more segments or portions mounted along predetermined portions or segments of the periphery of discharge opening 28.

Figure 5:
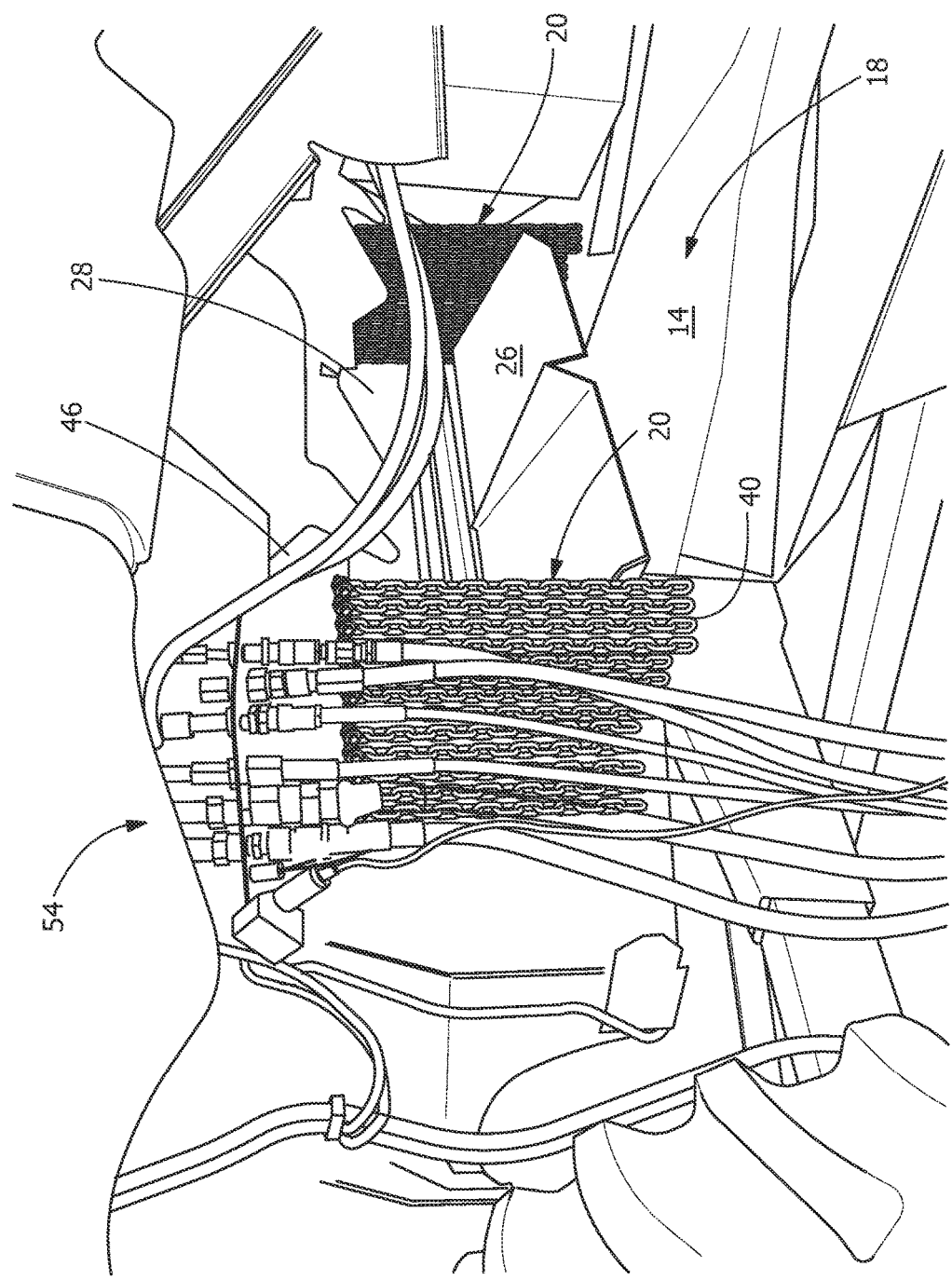
FIG. 5 is an enlarged, partial perspective view of the discharge end of the agricultural harvester taken from region 2 of FIG. 1.

As shown in FIGS. 3 and 4, discharge guide 20 comprises a porous apparatus 21 having at least one chain 40 having interconnected links 42 and adapted for mounting to a structure 46 of the agricultural harvester, such as by fasteners 44, such as removable mechanical fasteners. As shown in FIG. 5, chain 40 is suspended from structure 46 forming a portion of discharge end 18. As further shown in FIGS. 3 and 4, chain(s) 40 include slidably interconnected links 42 having an elongated toroidal shape, in which the interconnected links 42 provide chain 40 with a high degree of flexibility. In another embodiment, links 42 can have a geometry different than an elongated toroidal shape, such as rectangular shape or any other suitable shape. As to flexibility, in one embodiment, the arrangement of interconnected links 42 permits relative movement of portions of the chain in any direction in three-dimensional space relative to the remaining portion of the chain.

In one embodiment, all links 42 can be the same relative to one another. In another embodiment, at least one link 42 can be different from another link 42 of chain 40. That is, at least one link can differ from another link in size, shape and/or material as desired, in which such differences can apply to a partial chain, an entire chain, or multiple entire chains. In one embodiment, discharge guide 20 comprises a plurality of chains 40 spaced apart from each other, such as a uniform predetermined spacing 48. In another embodiment, the spacing between one or more of adjacent chains 40 can be different from each other. In one embodiment, one or more of chains 40 can be of uniform length 50. In another embodiment, one or more chains can have different lengths. In one embodiment, discharge guide 20 can be formed from a single continuous chain 40. In one embodiment, at least one chain 40 can include a ballast 52 that can be secured to an end of the chain opposite fasteners 44, or in another embodiment ballast 52 can be positioned anywhere along the length of the chain 40.

As shown in FIG. 5, discharge guide 20 which is mounted to structure 46 separates components 54 positioned in discharge end 18 of the agricultural harvester from guided crop residue discharge, such as crop residue 16 entrained in discharge air 30" (FIG. 2). That is, components 54 can include but are not limited to sensors, structure, lines configured to convey or distribute fluid/electrical/pneumatic power and/or control signals, fasteners or other items in discharge end 18. For example, as shown in FIG. 5, components 54 include hydraulic and electrical lines associated with providing power to and/or control of processing implement 12 (FIG. 1). By virtue of discharge guide 20 separating components 54 from crop residue entrained in discharge air 30", the components 54 are substantially protected from an accumulation of crop residue on the components 54, which can adversely affect their operation, and can block air flow around the components 54, resulting in increased velocity of discharge air 30".

In light of all the foregoing, it should thus be apparent to those skilled in the art that there has been shown and described a discharge guide, and method of use thereof, that can be utilized to provide a guided discharge of crop residue onto an agricultural field from which the crop was harvested, or onto a processing implement towed behind an agricultural harvester. However, it should also be apparent that, within the principles and scope of the invention, many changes are possible and contemplated, including in the details, materials, steps, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. An agricultural harvester comprising an agricultural harvester discharge guide configured to guide crop residue entrained in a volume of air flowing therethrough, the crop residue entrained in the volume of air having an initial concentration, the agricultural harvester discharge guide comprising:

a housing having opposed, first and second sides having corresponding lower ends and a discharge surface spaced from the lower ends of the first and second sides of the housing by first and second air discharge ports, respectively, the first and second sides and the discharge surface defining a discharge opening configured to direct the crop residue in a discharge direction, opposite a direction of travel of the agricultural harvester;

a first porous apparatus extending between the lower end of the first side of the housing and the discharge surface and positioned in the first discharge port, the first porous apparatus adapted to allow a first portion of the air to pass therethrough in a first exhaust direction, substantially perpendicular to the direction of travel, while discouraging the crop residue from passing therethrough in the first exhaust direction; and a second porous apparatus extending between the lower end of the second side of the housing and the discharge surface and positioned in the second discharge port, the second porous apparatus adapted to allow a second portion of the air to pass therethrough in a second exhaust direction, substantially perpendicular to the direction of travel and substantially opposite the first exhaust direction, while discouraging the crop residue from passing therethrough in the second exhaust direction;

wherein the first and second porous apparatus are configured to reduce the volume and velocity of the air flowing through the discharge opening in the housing, to maintain flow of the crop residue in the discharge direction as the crop residue flows through the agricultural harvester discharge guide toward the discharge opening, and to increase the concentration of the crop residue entrained in the volume of air passing through the discharge opening in the housing.

2. The agricultural harvester of claim 1, wherein the agricultural harvester is adapted for towing a processing implement to receive guided crop residue discharge from the agricultural harvester.

3. The agricultural harvester of claim 2, wherein the processing implement is a baler.

4. The agricultural harvester of claim 2, wherein components positioned in a discharge end of the agricultural harvester include components associated with the processing implement.

5. The agricultural harvester of claim 4, wherein components associated with the processing implement include components associated with providing power and/or control of the processing implement.

6. The agricultural harvester of claim 1, wherein each porous apparatus is flexible.

7. The agricultural harvester of claim 1, wherein each porous apparatus is configured to be suspendibly mounted adjacent to the discharge opening.

8. The agricultural harvester of claim 1, wherein each porous apparatus includes at least one chain.

9. The agricultural harvester of claim 8, wherein at least one link of the at least one chain is different from another link of the at least one chain.

10. The agricultural harvester of claim 1, wherein each porous apparatus includes at least one chain having ballast secured thereto.

11. The agricultural harvester of claim 1, wherein each porous apparatus includes at least one chain having a different length than another chain.

12. The agricultural harvester of claim 1, wherein each porous apparatus includes a plurality of chains spaced apart from each other.

13. The agricultural harvester of claim 12, wherein at least one spacing between adjacent chains of the plurality of chains is different.

14. An agricultural harvester comprising an agricultural harvester discharge guide configured to guide crop residue entrained in a volume of air flowing therethrough, the crop residue entrained in the volume of air having an initial concentration, the agricultural harvester discharge guide comprising:

a housing having opposed, first and second sides having corresponding lower ends and a discharge surface spaced from the lower ends of the first and second sides of the housing by first and second air discharge ports, respectively, the first and second sides and the discharge surface defining a discharge opening configured to direct the crop residue in a discharge direction, opposite a direction of travel of the agricultural harvester;

a first porous apparatus suspended over the first discharge port, the first porous apparatus adapted to allow a first portion of the air to pass therethrough in a first exhaust direction, substantially perpendicular to the direction of travel, while discouraging the crop residue from passing therethrough in the first exhaust direction; and a second porous apparatus suspended over the second discharge port, the second porous apparatus adapted to allow a second portion of the air to pass therethrough in a second exhaust direction, substantially perpendicular to the direction of travel and substantially opposite the first exhaust direction, while discouraging the crop residue from passing therethrough in the second exhaust direction;

wherein the first and second porous apparatus are configured to reduce the volume and velocity of the air flowing through the discharge opening in the housing, to maintain flow of the crop residue in the discharge direction as the crop residue flows through the agricultural harvester discharge guide toward the discharge opening, and to increase the concentration of the crop residue entrained in the volume of air passing through the opening in the housing.

15. The agricultural harvester of claim 14, wherein the agricultural harvester is adapted for towing a processing implement to receive guided crop residue discharged from the agricultural harvester.

16. An agricultural harvester comprising an agricultural harvester discharge guide configured to guide crop residue entrained in a volume of air flowing therethrough, the crop residue entrained in the volume of air having an initial concentration, the agricultural harvester discharge guide comprising:

a housing having opposed, first and second sides having corresponding lower ends and a discharge surface spaced from the lower ends of the first and second sides of the housing by first and second air discharge ports, respectively, the first and second sides and the discharge surface defining a discharge opening configured to direct the crop residue in a discharge direction, opposite a direction of travel of the agricultural harvester;

a first porous apparatus extending between the lower end of the first side of the housing and the discharge surface and positioned in the first discharge port, the first porous apparatus adapted to allow a first portion of the air to pass therethrough in a first exhaust direction, substantially perpendicular to the direction of travel, while discouraging the crop residue from passing therethrough in the first exhaust direction; and a second porous apparatus extending between the lower end of the second side of the housing and the discharge surface and positioned in the second discharge port, the second porous apparatus adapted to allow a second portion of the air to pass therethrough in a second exhaust direction, substantially perpendicular to the direction of travel and substantially opposite the first exhaust direction, while discouraging the crop residue from passing therethrough in the second exhaust direction;

wherein the first and second porous apparatus are configured to reduce the volume and velocity of the air flowing through the discharge opening in the housing, to discourage lateral expansion of crop residue flow through the agricultural harvester discharge guide, and to increase the concentration of the crop residue entrained in the volume of air passing through the opening in the housing.

17. The agricultural harvester of claim 16, wherein each porous apparatus is flexible.

18. The agricultural harvester of claim 16, wherein each porous apparatus is adapted for suspendible mounting adjacent to the discharge opening.

19. An agricultural harvester comprising an agricultural harvester discharge guide configured to guide crop residue entrained in a volume of air flowing therethrough, the crop residue entrained in the volume of air having an initial concentration, the agricultural harvester discharge guide comprising:

a housing having opposed, first and second sides having corresponding lower ends and a discharge surface spaced from the lower ends of the first and second sides of the housing by first and second air discharge ports, respectively, the first and second sides and the discharge surface defining a discharge opening configured to direct the crop residue in a discharge direction, opposite a direction of travel of the agricultural harvester;

a first porous apparatus suspended over the first discharge port, the first porous apparatus adapted to allow a first portion of the air to pass therethrough in a first exhaust direction, substantially perpendicular to the direction of travel, while discouraging the crop residue from passing therethrough in the first exhaust direction; and a second porous apparatus suspended over the second discharge port, the second porous apparatus adapted to allow a second portion of the air to pass therethrough in a second exhaust direction, substantially perpendicular to the direction of travel and substantially opposite the first exhaust direction, while discouraging the crop residue from passing therethrough in the second exhaust direction;

wherein the first and second porous apparatus are configured to reduce the volume and velocity of the air flowing through the discharge opening in the housing, to discourage lateral expansion of crop residue flow through the agricultural harvester discharge guide, and to increase the concentration of the crop residue entrained in the volume of air passing through the opening in the housing.

* * * * *